US012760687B2

(12) United States Patent
Ben Balaid et al.

(10) Patent No.: US 12,760,687 B2
(45) Date of Patent: Oct. 13, 2026

(54) BLEED AIR SYSTEMS FOR AIRCRAFT ENGINES

(71) Applicant: PRATT & WHITNEY CANADA CORP., Longueuil (CA)

(72) Inventors: Iliasse Ben Balaid, Saint-Laurent (CA); Sid-Ali Meslioui, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/080,320

(22) Filed: Mar. 14, 2025

(65) Prior Publication Data

US 2026/0275921 A1 Sep. 17, 2026

(51) Int. Cl.
*F02C 9/18* (2006.01)
*F02C 6/08* (2006.01)
*F02C 7/045* (2006.01)

(52) U.S. Cl.
CPC .................. *F02C 9/18* (2013.01); *F02C 6/08* (2013.01); *F02C 7/045* (2013.01); *F05D 2220/323* (2013.01); *F05D 2260/96* (2013.01)

(58) Field of Classification Search
CPC ..................................... F02C 6/08; F02C 9/18
See application file for complete search history.

(56) References Cited

U.S. PATENT DOCUMENTS 9,951,690 B2 4/2018 Labrecque et al.
2015/0231946 A1 8/2015 Bianchi
2018/0073435 A1* 3/2018 Chen .......................... F02C 7/24
2019/0360404 A1 11/2019 Staudte
2023/0228220 A1* 7/2023 Malkus ...................... F01D 9/04 415/36
2023/0332539 A1* 10/2023 Subramanian ............ F02C 9/18
2024/0426244 A1 12/2024 Ganji et al.

FOREIGN PATENT DOCUMENTS

DE 102004002762 B4 3/2006
EP 4741644 5/2026

OTHER PUBLICATIONS

Extended European Search Report dated Jul. 17, 2026, Application No. 26165219.2.

* cited by examiner

*Primary Examiner* — Scott J Walthour
(74) *Attorney, Agent, or Firm* — NORTON ROSE FULBRIGHT CANADA LLP

(57) ABSTRACT

An aircraft engine, has: an engine core including a compressor and a combustor; a casing defining a bleed port downstream of an inlet of the compressor and upstream of the combustor; a bleed air system connected to the bleed port and having: a bleed air conduit communicating with the bleed port and defining a bleed passage; and a connector connecting the bleed port to the bleed air conduit and extending from a port end at the bleed port to a conduit end at the bleed air conduit, the connector having a peripheral wall extending around a connector axis transversally intersecting the casing, the peripheral wall having an inner surface facing and exposed to the bleed passage, the inner surface defining ribs extending at least partially circumferentially around the connector axis, the ribs being axially distributed relative to the connector axis between the port end and the conduit end.

18 Claims, 5 Drawing Sheets

BLEED AIR SYSTEMS FOR AIRCRAFT ENGINES

TECHNICAL FIELD

The present disclosure relates generally to aircraft engines and, more particularly, to systems and methods used to extract compressed air from compressors of such engines to feed secondary air systems.

BACKGROUND

Aircraft engines, such as gas turbine engines, have compressors that compress air fed to combustors. Compressed bleed air is often bled from a main gaspath of the compressors to supply secondary air systems. This bleed air may be used, for instance, for cooling down components, pressurizing bearing cavities, and so on. Existing systems and methods for extracting this compressed air are satisfactory, but there remain a need for improvements.

SUMMARY

In one aspect, there is provided an aircraft engine, comprising: an engine core including a compressor and a combustor downstream of the compressor relative to a gas flow through the engine core; a casing surrounding the engine core, the casing defining a bleed port downstream of an inlet of the compressor and upstream of the combustor relative to the gas flow; a bleed air system fluidly connected to the bleed port, the bleed air system having: a bleed air conduit fluidly communicating with the bleed port, the bleed air conduit defining a bleed passage for a bleed air flow; and a connector fluidly connecting the bleed port to the bleed air conduit, the connector extending from a port end at the bleed port to a conduit end at the bleed air conduit, the connector having a peripheral wall extending around a connector axis transversally intersecting the casing, the peripheral wall having an inner surface facing and exposed to the bleed passage, the inner surface defining ribs extending at least partially circumferentially around the connector axis, the ribs being axially distributed relative to the connector axis between the port end and the conduit end of the connector.

The aircraft engine described above may include any of the following features, in any combinations.

In some embodiments, the connector has an upstream section located upstream of a plane normal to a central axis of the aircraft engine and intersecting the connector axis at the port end, and a downstream section located downstream of the plane relative to the gas flow through the engine core, the ribs located at least within the downstream section.

In some embodiments, the downstream section has a downstream-most location being overlapped by the ribs.

In some embodiments, the ribs extend fully around the connector axis.

In some embodiments, the connector has a flow circulating area taken on a plane normal to the connector axis, the flow circulating area decreasing along the bleed air flow.

In some embodiments, the connector axis extends in a direction having both of a radially outward and axially rearward component relative to a central axis of the aircraft engine.

In some embodiments, the connector has a length (L) extending along the connector axis from the port end to the conduit end, the port end having a diameter (d), wherein the length (L) is at least about 10% of the diameter (d) and at most about 250% of the diameter (d).

In some embodiments, the port end of the connector has a diameter (d), the ribs being defined by successive crests and valleys, the crests intersected by a baseline surface of the connector, the ribs having a depth (a) extending transversally to the baseline surface between tops of the crests and bottoms of the valleys, wherein the depth (a) is at least about 0.05% of the diameter and at most about 100% of the diameter.

In some embodiments, the connector has a length (L) extending along the connector axis from the port end to the conduit end, the ribs being defined by successive crests and valleys, the ribs having a span (s), the span (s) defined as a distance between two successive tops of the crests, a ratio of the span (s) to the length (L) being from 0.01% to 100%.

In some embodiments, the bleed air conduit is devoid of the ribs.

In another aspect, there is provided a compressor section for an aircraft engine, comprising: a casing extending around a central axis, the casing defining a bleed port; a bleed air conduit fluidly communicating with the bleed port and defining a bleed passage; and a connector fluidly connecting the bleed port to the bleed air conduit, the connector extending from a port end at the bleed port to a conduit end at the bleed air conduit, the connector having a peripheral wall extending around a connector axis transversally intersecting the casing, the peripheral wall having an inner surface facing and exposed to the bleed passage, the inner surface defining ribs axially distributed relative to the connector axis between the port end and the conduit end of the connector, the ribs extending length-wise transversally to a direction of an air flow from the bleed port to the bleed air conduit, and the ribs extending depth-wise away from the connector axis.

The compressor section described above may include any of the following features, in any combinations.

In some embodiments, the connector has an upstream section located upstream of a plane normal to a central axis of the aircraft engine and intersecting the connector axis at the port end, and a downstream section located downstream of the plane relative to a gas flow through the compressor section, the ribs located at least at the downstream section.

In some embodiments, the downstream section has a downstream-most location being overlapped by the ribs.

In some embodiments, the ribs extend fully around the connector axis.

In some embodiments, the connector has a flow circulating area taken on a plane normal to the connector axis, the flow circulating area decreasing along the air flow.

In some embodiments, the connector axis extends in a direction having both of a radially outward and axially rearward component relative to a central axis of the aircraft engine.

In some embodiments, the connector has a length (L) extending along the connector axis from the port end to the conduit end, the port end having a diameter (d), wherein the length (L) is at least about 10% of the diameter (d) and at most about 250% of the diameter (d).

In some embodiments, the port end of the connector has a diameter (d), the ribs being defined by successive crests and valleys, the crests intersected by a baseline surface of the connector, the ribs having a depth (a) extending transversally to the baseline surface between tops of the crests and bottoms of the valleys, wherein the depth (a) is at least about 0.05% of the diameter and at most about 100% of the diameter.

In some embodiments, the connector has a length (L) extending along the connector axis from the port end to the conduit end, the ribs being defined by successive crests and valleys, the ribs having a span (s), the span (s) defined as a distance between two successive tops of the crests, a ratio of the span (s) to the length (L) being from 0.01% to 100%.

In some embodiments, the bleed air conduit is devoid of the ribs.

BRIEF DESCRIPTION OF THE DRAWINGS

Reference is now made to the accompanying figures in which.

DETAILED DESCRIPTION

Figure 1:
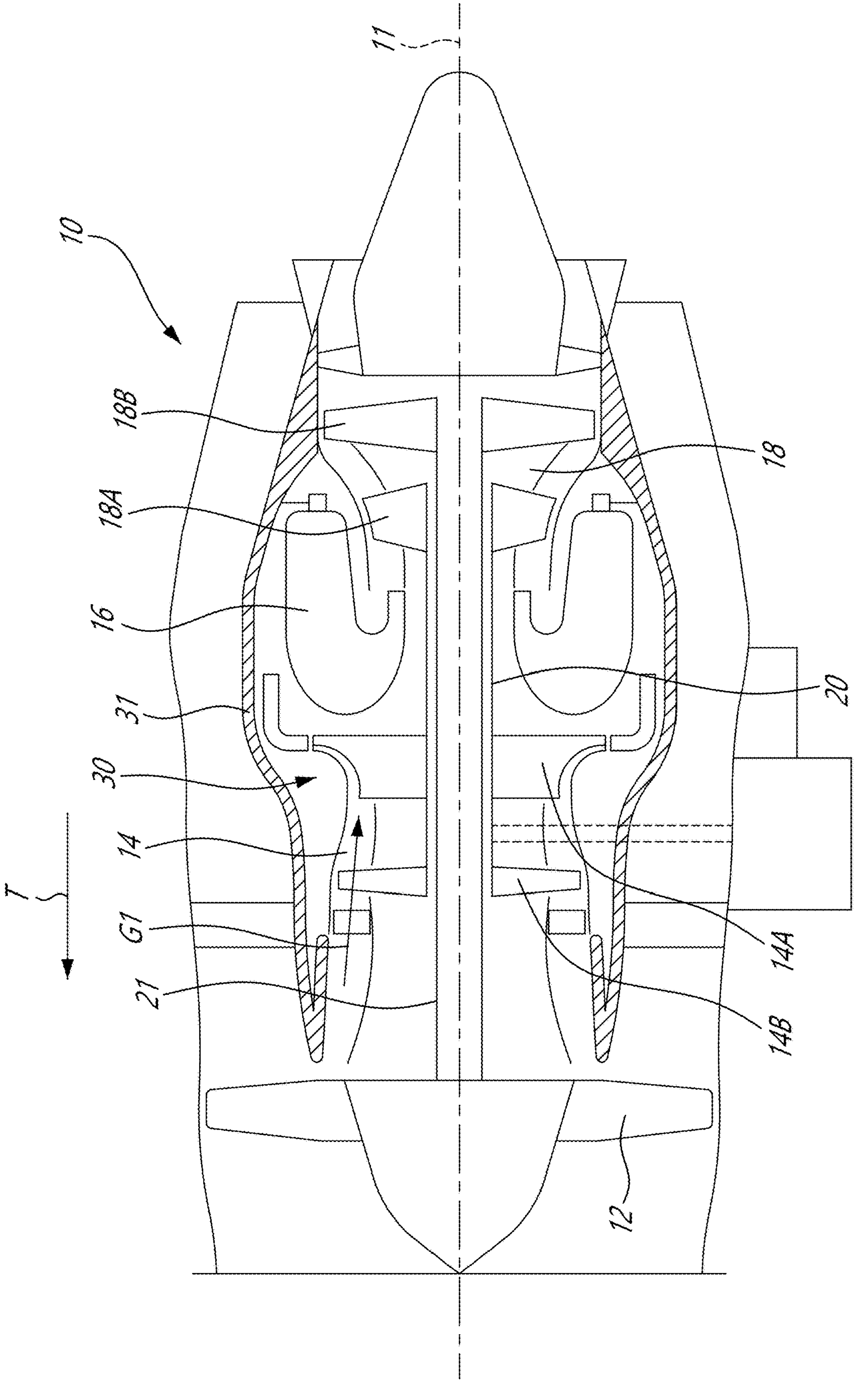
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

Figure 2:
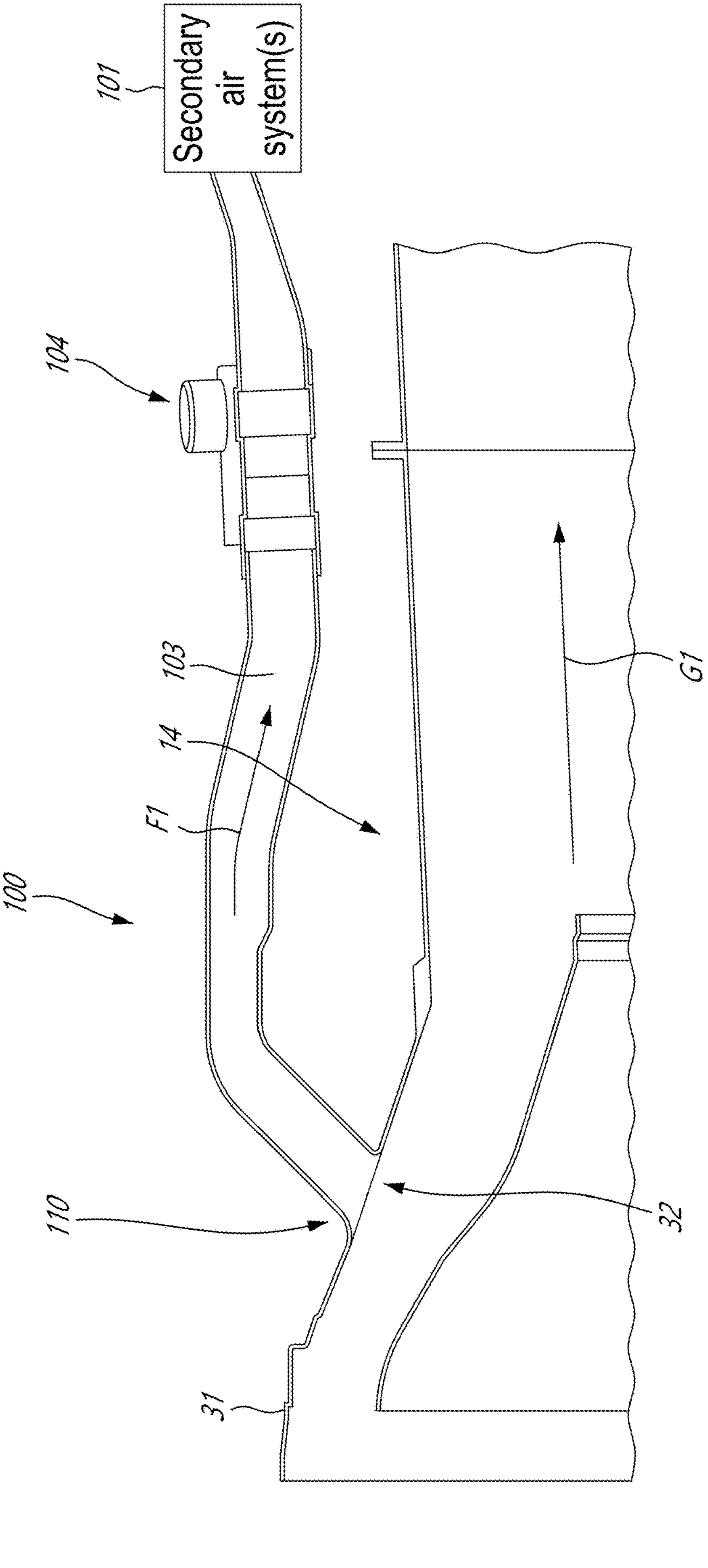
FIG. 2 is a cutaway view of a compressor section of the gas turbine engine of FIG. 1.

Referring to FIGS. 1-2, the compressor section 14, the combustor 16, and the turbine section 18 define an engine core 30 of the gas turbine engine 10. These components are disposed in serial flow communication relative to a gas flow G1 through the engine core 30. The engine core 30 is surrounded by a casing 31 defining a bleed port 32 downstream of an inlet of the compressor section 14 and upstream of the combustor 16 relative to the gas flow G1.

Referring to FIG. 2, in some embodiments, the gas turbine engine 10 includes a bleed air system 100 for feeding compressed air to secondary air systems 101. The bleed air system 100 is fed with compressed air via the bleed port 32 defined through the casing 31. The secondary air systems 101 may include an active clearance control system that receives air bled from the compressor section 14 and fed to the turbine section 18 to enhance efficiency of the turbine section 18. More specifically, the active clearance control system uses the compressed air bled from the compressor section 14 to cool down turbine shrouds that surround the blades of the turbine section 18. This limits thermal expansion of the turbine shrouds to maintain a tip clearance-a radial gap between tips of the blades and the turbine shrouds—as small as possible to limit a phenomenon referred to as tip leakage.

The bleed air system 100 includes a bleed air conduit 103 fluidly communicating with the bleed port 32 for receiving compressed air drawn from the compressor section 14. The bleed air conduit 103 defines a bleed passage for an air flow F1, also referred to as a bleed air flow. A bleed valve 104 is fluidly connected to the bleed air conduit 103 downstream of the bleed port 32 relative to the air flow F1 through the bleed air conduit 103. The bleed valve 104 may be an actuated valve (e.g., servo valve) operatively connected to a controller operable to cause the bleed valve 104 to open or close to vary a flow rate of the compressed air reaching the secondary air systems 101.

It has been observed that when the bleed valve 104 is closed, flow instabilities (e.g., vortex shedding) develop above the bleed port 32. This may cause excitation when the vortex shedding frequency crosses acoustic modes of the bleed air conduit 103. This may induce resonance. As a consequence, higher tones or pure frequencies may be generated and may be detrimental to surrounding structures and cause external and cabin noise.

Figure 3B:
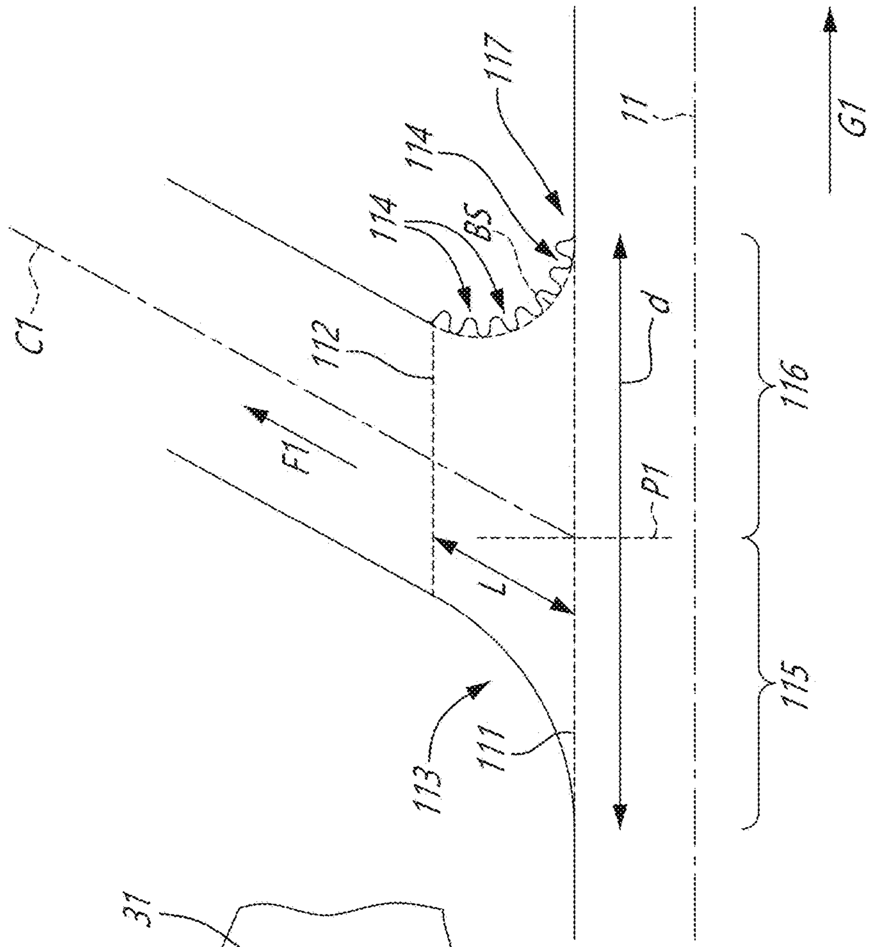
FIG. 3B is a cross-sectional view of the connector of FIG. 3A.
Figure 3A:
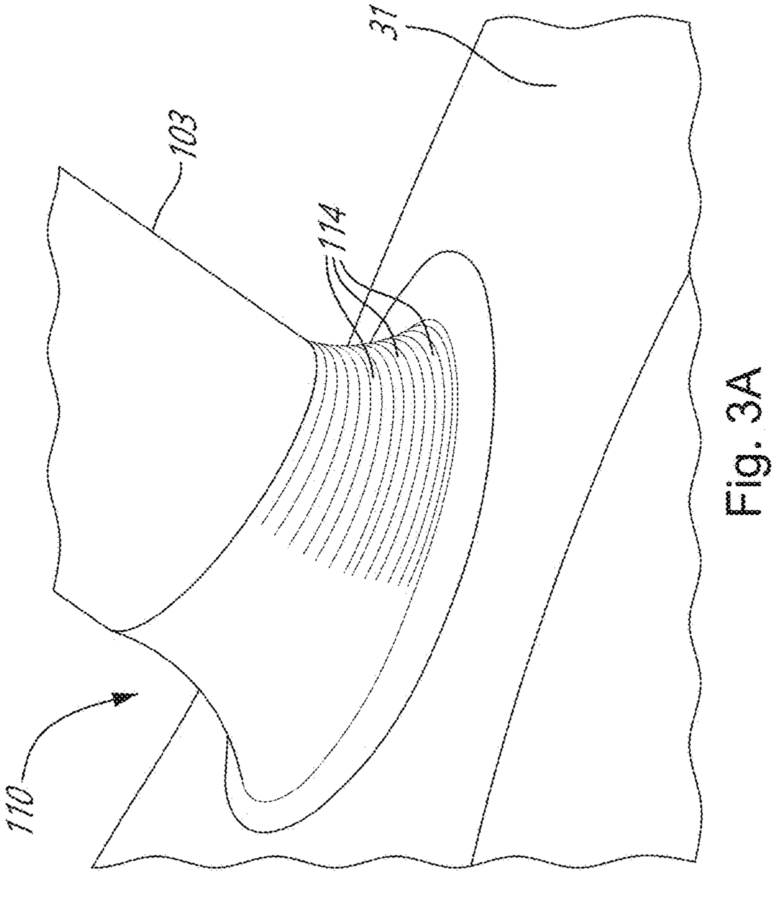
FIG. 3A is a three dimensional view of a connector for connecting a bleed port to a bleed air conduit.

As shown in FIGS. 3A-3B, to at least partially alleviate this drawback, the bleed air system 100 includes a connector 110 for connecting the bleed port 32 to the bleed air conduit 103. The connector 110 extends from a port end 111 at the bleed port 32 to a conduit end 112 at the bleed air conduit 103. The connector 110 has a peripheral wall 113 having an inner surface facing and exposed to the bleed passage. The peripheral wall 113 extends around a connector axis C1 transversally intersecting the casing 31. In the embodiment shown, the connector axis C1 extends in a direction having a radially outward component and an axially rearward component relative to the central axis 11 of the gas turbine engine 10. Herein, the expression "rearward" is in relation to a direction of travel T of the gas turbine engine 10.

In some embodiments, an area of the bleed port 32 is greater than that of the bleed air conduit 103. The peripheral wall 113 of the connector 110 may be curved to accommodate this difference in area. In the embodiment shown, the connector 110 is designed to smoothly blend to both the bleed air conduit 103 and the casing 31. In other words, the port end 111 of the connector 110 may be tangent to the casing 31 while the conduit end 112 of the connector 110 may be tangent to the bleed air conduit 103. The connector 110 has a flow circulating area taken on a plane normal to the connector axis. The flow circulating area decreases along the air flow F1 through the bleed air conduit 103.

To mitigate the resonance phenomenon described above, the peripheral wall 113 of the connector 110 defines ribs 114, which may be referred to as vibration-mitigating ribs. The ribs 114 are defined by the inner surface of the peripheral wall 113 such as to be exposed to the air flow F1 through the bleed air conduit 103. The ribs 114 are axially distributed along the connector axis C1 between the port end 111 and the conduit end 112 and extend at least partially circumferentially around the connector axis C1. The ribs 114 extend length-wise transversally to a direction of the air flow F1 from the bleed port 32 to the bleed air conduit 103. The ribs 114 also extend depth-wise away from the connector axis C1. The ribs 114 may be referred to as quasi-annular as they need not extend a full circumference of the connector 110. In all the configurations described above, the bleed air conduit 103 may be devoid of the ribs 114. That is, the ribs 114 may be located solely on the connector 110. The peripheral wall 113 may be referred to as "wavy" because of the ribs.

The connector 110 may be divided into two sections, namely, an upstream section 115 and a downstream section 116 located downstream of the upstream section 115 relative to the gas flow G1 through the engine core 30. The sections may be separated from one another by an imaginary plane P1 being normal (i.e., perpendicular) to the central axis 11 of the gas turbine engine 10 and intersecting the connector axis C1 at the port end 111. In the embodiment of FIGS. 3A-3B, the ribs 114 are located at least at the downstream section 116. The upstream section 115 may be devoid of the ribs 114. The downstream section 116 has a downstream-most location 117, which is overlapped by the ribs 114. The downstream-most location 117 may be regarded as a down-stream-most point of a periphery of the bleed port 32 relative to the gas flow G1 through the engine core 30.

Figure 4B:
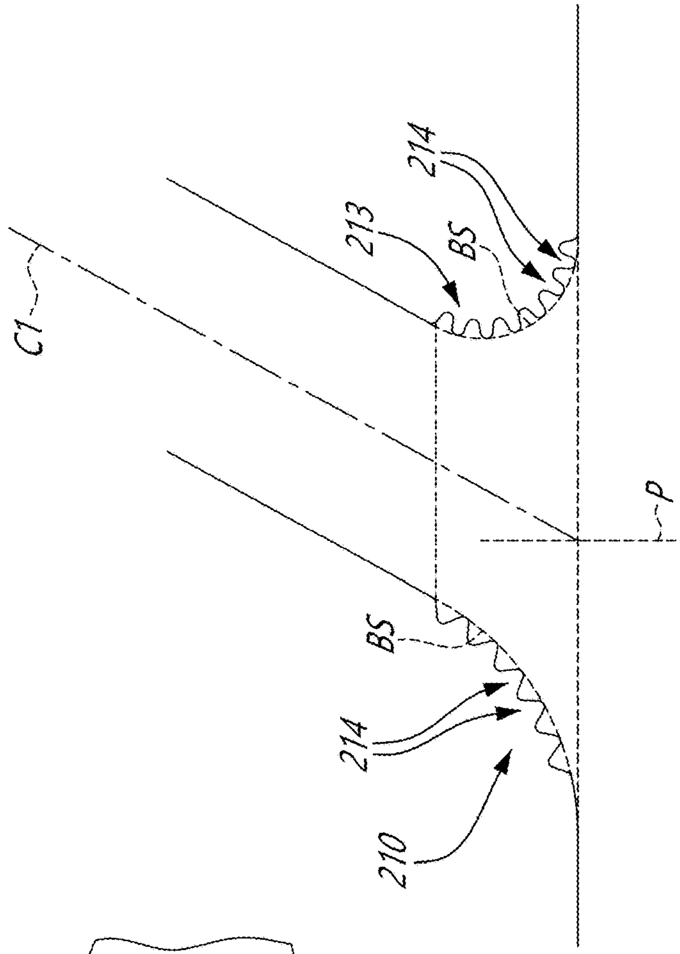
FIG. 4B is a cross-sectional view of the connector of FIG. 4A.
Figure 4A:
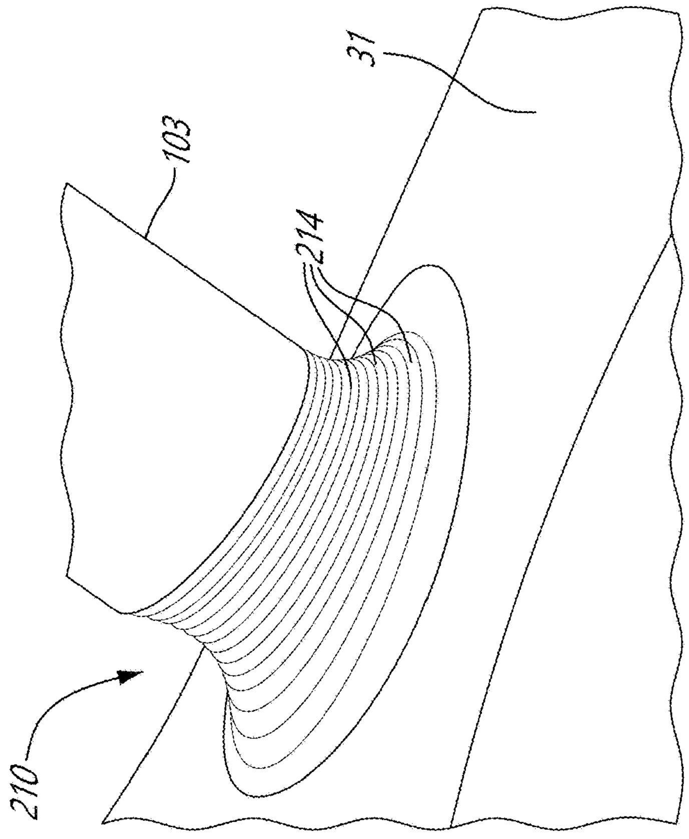
FIG. 4A is a three dimensional view of another connector for connecting the bleed port to the bleed air conduit.

Referring now to FIGS. 4A-4B, another embodiment of a connector 210 is shown. For the sake of conciseness, only features differing from the connector 110 described above with reference to FIGS. 3A-3B are described below. In this embodiment, the peripheral wall 213 includes ribs 214 extending fully circumferentially around the connector axis C1. The ribs 214 may be referred to as fully annular ribs since each of these ribs 214 may fully annularly extending around the connector axis C1.

Figure 5:
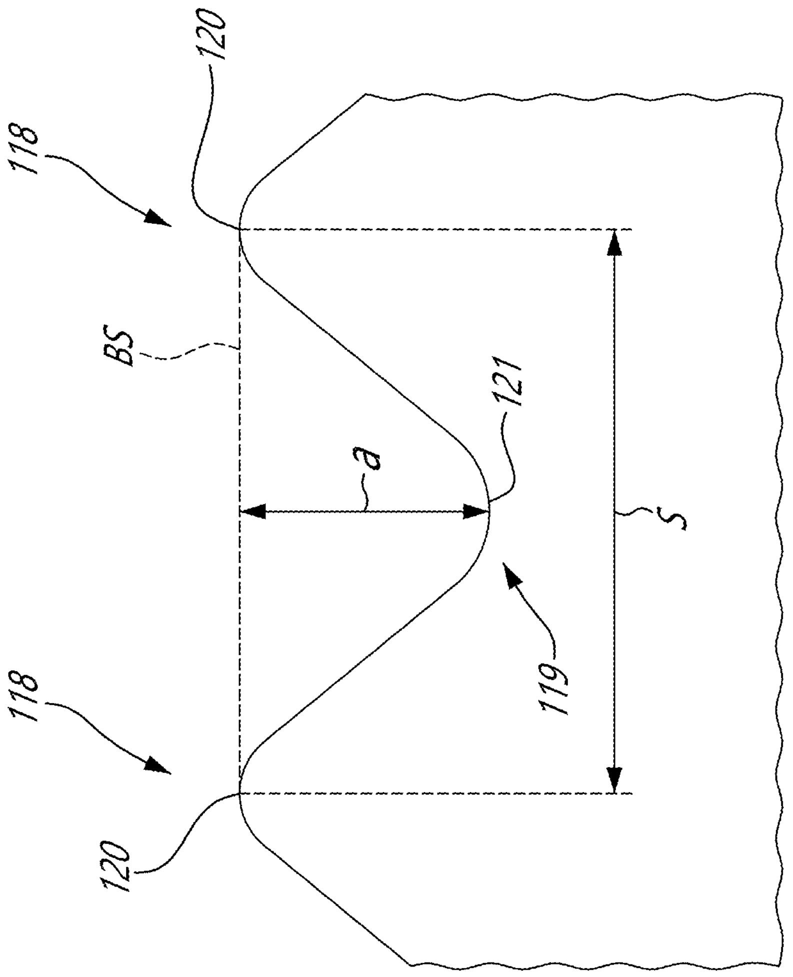
FIG. 5 is an enlarged view of ribs of the connectors of FIGS. 3A and 4A.

Referring now to FIG. 5, features of the ribs 114, whether for the connector 110 of FIGS. 3A-3B or the connector 210 of FIGS. 4A-4B are described below.

The connector 110 has a length L (FIG. 3B) extending along the connector axis C1 from the port end 111 to the conduit end 112. The port end 111 having a diameter d (FIG. 3B). The length L may be at least about 10% of the diameter d and at most about 250% of the diameter d. In this disclosure, the expression "about" implies variations of plus or minus 10%. In some embodiments, the ribs 114 are defined by successive crests 118 and valleys 119. The crests 118 are intersected by a baseline surface BS of the connector 110. The ribs 114 having a depth a extending transversally to the baseline surface BS between tops 120 of the crests 118 and bottoms 121 of the valleys 119. Herein, the expression "tops" refer to apexes of the crests whereas the expression "bottoms" refer to deepest-most points of the valleys. The depth a may be at least 0.05% of the diameter d and at most 100% of the diameter d. The ribs 114 may have a span s defined as a distance between two successive tops 120 of the crests 118. A ratio of the span (s) to the length (L) being from 0.01% to 100%.

The disclosed connectors 110, 210 having the ribs 114, 214 may reduce acoustic and vibration response of the bleed air conduit 103. The ribs may act on breaking up the vortices to weaken excitation sources.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be com-bined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:

an engine core including a compressor and a combustor downstream of the compressor relative to a gas flow through the engine core;

a casing surrounding the engine core, the casing defining a bleed port downstream of an inlet of the compressor and upstream of the combustor relative to the gas flow;

a bleed air system fluidly connected to the bleed port, the bleed air system having:

a bleed air conduit fluidly communicating with the bleed port, the bleed air conduit defining a bleed passage for a bleed air flow; and a connector fluidly connecting the bleed port to the bleed air conduit, the connector extending from a port end at the bleed port to a conduit end at the bleed air conduit, the connector having a peripheral wall extending around a connector axis transversally intersecting the casing, the peripheral wall having an inner surface facing and exposed to the bleed passage, the inner surface defining ribs extending at least partially circumferentially around the connector axis, the ribs being distributed at a plurality of axial locations along the connector axis between the port end and the conduit end of the connector, the connector having an upstream section located upstream of a plane normal to a central axis of the aircraft engine and intersecting the connector axis at the port end, and a downstream section located downstream of the plane relative to the gas flow through the engine core, the ribs located at least within the downstream section, wherein the ribs are configured to reduce acoustic and vibration responses of the bleed air conduit.

2. The aircraft engine of claim 1, wherein the downstream section has a downstream-most location being overlapped by the ribs.

3. The aircraft engine of claim 1, wherein the ribs extend fully around the connector axis.

4. The aircraft engine of claim 1, wherein the connector has a flow circulating area taken on a plane normal to the connector axis, the flow circulating area decreasing as the connector extends away from the casing.

5. The aircraft engine of claim 1, wherein the connector axis extends in a direction having both of a radially outward and axially rearward component relative to the central axis of the aircraft engine.

6. The aircraft engine of claim 1, wherein the connector has a length (L) extending along the connector axis from the port end to the conduit end, the port end having a diameter (d), wherein the length (L) is at least about 10% of the diameter (d) and at most about 250% of the diameter (d).

7. The aircraft engine of claim 1, wherein the port end of the connector has a diameter (d), the ribs being defined by successive crests and valleys, the crests intersected by a baseline surface of the connector, the ribs having a depth (a) extending transversally to the baseline surface between tops of the crests and bottoms of the valleys, wherein the depth (a) is at least about 0.05% of the diameter and at most about 100% of the diameter.

8. The aircraft engine of claim 1, wherein the connector has a length (L) extending along the connector axis from the port end to the conduit end, the ribs being defined by successive crests and valleys, the ribs having a span (s), the span (s) defined as a distance between two successive tops of the crests, a ratio of the span (s) to the length (L) being from 0.01% to 100%.

9. The aircraft engine of claim 1, wherein the bleed air conduit is devoid of the ribs.

10. A compressor section for an aircraft engine, comprising:

a casing extending around a central axis, the casing defining a bleed port;

a bleed air conduit fluidly communicating with the bleed port and defining a bleed passage; and a connector fluidly connecting the bleed port to the bleed air conduit, the connector extending from a port end at the bleed port to a conduit end at the bleed air conduit, the connector having a peripheral wall extending around a connector axis transversally intersecting the casing, the peripheral wall having an inner surface facing and exposed to the bleed passage, the inner surface defining ribs distributed at a plurality of axial locations along the connector axis between the port end and the conduit end of the connector, the ribs extending length-wise transversally to a direction of an air flow from the bleed port to the bleed air conduit, and the ribs extending depth-wise away from the connector axis, the connector has an upstream section located upstream of a plane normal to the central axis and intersecting the connector axis at the port end, and a downstream section located downstream of the plane relative to a gas flow through the compressor section, the ribs located at least at the downstream section, wherein the ribs are configured to reduce acoustic and vibration responses of the bleed air conduit.

11. The compressor section of claim 10, wherein the downstream section has a downstream-most location being overlapped by the ribs.

12. The compressor section of claim 10, wherein the ribs extend fully around the connector axis.

13. The compressor section of claim 10, wherein the connector has a flow circulating area taken on a plane normal to the connector axis, the flow circulating area decreasing as the connector extends away from the casing.

14. The compressor section of claim 10, wherein the connector axis extends in a direction having both of a radially outward and axially rearward component relative to the central axis.

15. The compressor section of claim 10, wherein the connector has a length (L) extending along the connector axis from the port end to the conduit end, the port end having a diameter (d), wherein the length (L) is at least about 10% of the diameter (d) and at most about 250% of the diameter (d).

16. The compressor section of claim 10, wherein the port end of the connector has a diameter (d), the ribs being defined by successive crests and valleys, the crests intersected by a baseline surface of the connector, the ribs having a depth (a) extending transversally to the baseline surface between tops of the crests and bottoms of the valleys, wherein the depth (a) is at least about 0.05% of the diameter and at most about 100% of the diameter.

17. The compressor section of claim 10, wherein the connector has a length (L) extending along the connector axis from the port end to the conduit end, the ribs being defined by successive crests and valleys, the ribs having a span (s), the span (s) defined as a distance between two successive tops of the crests, a ratio of the span (s) to the length (L) being from 0.01% to 100%.

18. The compressor section of claim 10, wherein the bleed air conduit is devoid of the ribs.

* * * * *